April 2, 1963   R. H. KUNZ   3,083,693
MULTI-PORT VALVE ASSEMBLY
Filed Sept. 17, 1958   6 Sheets-Sheet 1

INVENTOR.
ROBERT H. KUNZ
BY

FIG. 3

INVENTOR.
ROBERT H. KUNZ
BY

3,083,693
MULTI-PORT VALVE ASSEMBLY
Robert Henry Kunz, 389 Park St., Elgin, Ill.
Filed Sept. 17, 1958, Ser. No. 761,531
6 Claims. (Cl. 121—38)

This invention relates to valve mechanisms, and more particularly to a multi-port valve assembly having a rotary valve element which is rotatable to different operative positions so as to channel the flow of fluid through the valve in accordance with a desired scheme.

A main object of the invention is to provide a novel and improved multi-port valve assembly which is relatively simple in construction, which is rotatable through a cycle of positions utilizing the pressure of the fluid conveyed therethrough as the operating means for the valve, and eliminating the necessity of providing electric motors, gearing, or other complex mechanisms for rotating the valve element.

A further object of the invention is to provide an improved multi-port valve assembly of the type employing a ported valve element rotatably mounted therein, the assembly employing a pressure difference across an element associated with the rotary valve element for operating same, and being provided with relatively inexpensive means for intermittently rotating the valve element.

A still further object of the invention is to provide an improved multi-port valve assembly of the type employing a ported valve element rotatable to different operative positions, the assembly being smooth in operation over a wide range of fluctuating pressures, being easy to maintain in operating condition, and providing a clear indication of each stage of operation of the valve.

A still further object of the invention is to provide an improved multi-port valve assembly which may be mounted in various positions, for example, in a vertical or horizontal position, the valve being arranged so that it will operate over long periods of time without requiring readjustment or replacement of parts.

Further objects and advantages of the invention will become apparent from the following description and claims, and from the accompanying drawings, wherein:

Figures 2, 6:
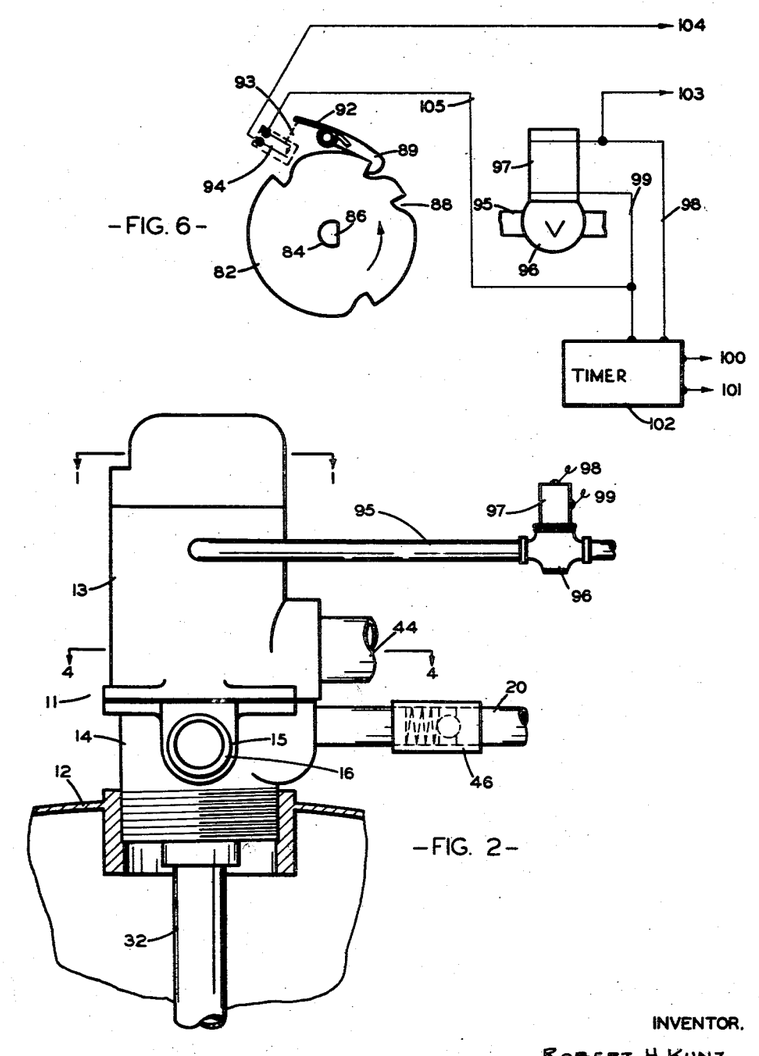
FIGURE 2 is a side elevational view of the multi-port valve assembly of FIGURE 1, shown mounted in the top portion of a water softener tank.
FIGURE 6 is a schematic diagram showing the electrical connections of the valve assembly of FIGURES 1 to 5, and the control equipment therewith.

Referring to FIGURE 2, 11 generally designates an improved multi-port valve assembly according to the present invention, the assembly being employed in conjunction with a water softener or similar installation wherein it is desired to obtain a definite cycle of different connections between a plurality of fluid connections in a definite timed sequence, as required to perform the respective successive operations of the equipment. Thus, the equipment may include water softening means, comprising a tank 12, which at times must be connected so the flow is directed through the successive stages of regeneration, namely, "wash," "salt," and "rinse" flows, followed by treated "soft" water flow to service.

Figure 4:
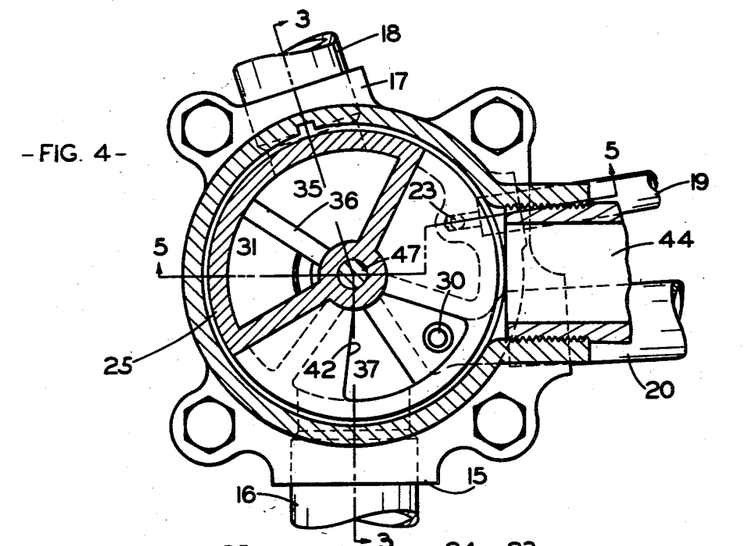
FIGURE 4 is an enlarged horizontal cross sectional view taken substantially on the line 4—4 of FIGURE 2.

The specific valve assembly 11, herein illustrated, includes a housing member 13 in the form of a generally cylindrical chamber which is sealingly connected to a bottom member 14 adapted to be mounted in the top wall of the water softener tank 12, as illustrated. The bottom member 14 includes a conduit connection 15, FIGURE 2, to which is connected a conduit 16 intended to convey treated soft water from the valve to the main soft water distributing system. The bottom member 14 includes another conduit connection 17 to which is connected the waste outlet conduit 18. Also connected to the bottom member 14, as shown in FIGURE 4, is a conduit 19 leading to a salt tank, not shown, and another conduit 20 leads from the salt tank to the bottom member 14 for conveying brine from the salt tank to the valve.

Figure 5:
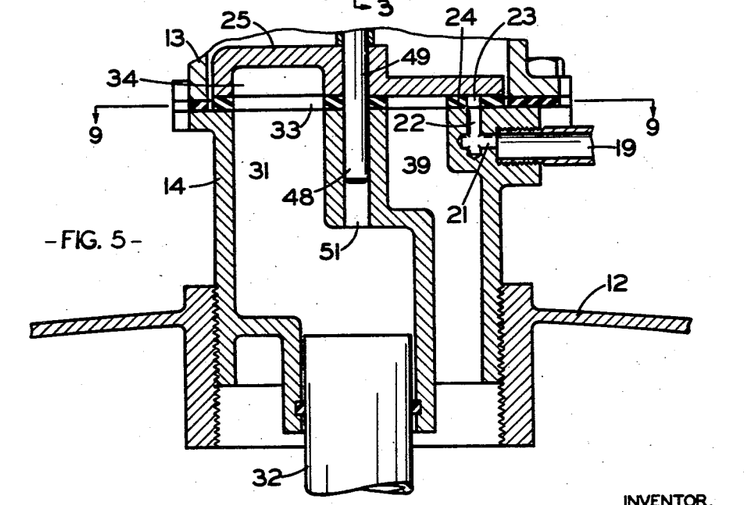
FIGURE 5 is a vertical cross sectional view taken on the line 5—5 of FIGURE 4.

As shown in FIGURE 5, the conduit 19 communicates with a passage 21 formed in the bottom member 14, said passage being in registry with a port 22, and aperture 23 in sealing gasket 24. Sealing gasket 24 is secured on the top surface of bottom member 14 and provides a seat for a rotary valve element 25 contained within the cylindrical housing member 13.

Figure 10:
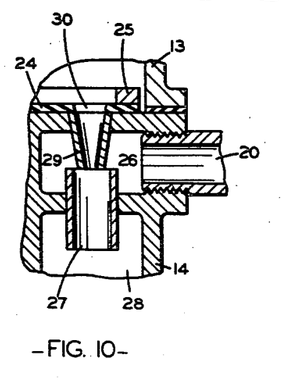
FIGURE 10 is an enlarged cross sectional detail view taken on the line 10—10 of FIGURE 9.
Figure 11:
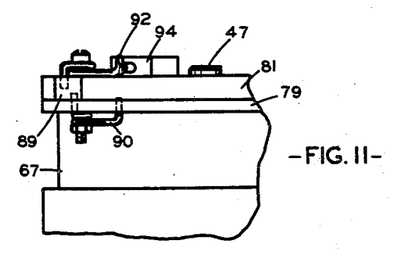
FIGURE 11 is a fragmentary elevational view taken on the line 11—11 of FIGURE 1.

The conduit 20 is similarly in communication with the cavity 26, FIGURE 10, formed in bottom member 14, and communicating with the top end of an injector tube 27 depending into a passage 28 opening into the top end of tank 12. A downwardly convergent ejector tube 29 is secured in the top wall of cavity 26 and is in axial alignment with, and communicates with the top end of tube 27, said tube 29 registering with an aperture 30 in the gasket 24, as shown in FIGURE 10.

Bottom member 14 is formed with a chamber 31 connected at its bottom end to a conduit 32 leading to the bottom of the water softener tank 12. At its top end, chamber 31 is offset and registers with an aperture 33 in the gasket 24. Valve element 25 is formed with a valve chamber 34 of substantial angular width, which, in the position shown in FIGURE 4, places chamber 31 in communication with a chamber 35 formed in member 14 and separated from the chamber 31 by a radial partition wall 36. Chamber 35 communicates with the waste outlet conduit connection 17. A further chamber 37, formed in member 14 is located adjacent the chamber 31 on the side thereof opposite the chamber 35, being separated from the chamber 31 by a radial partition wall 38. The chamber 37 communicates with the treated water outlet conduit connection 15.

The chamber 39, formed in the bottom member 14, is separated from chamber 35 by radial wall 40, and from cavity 26 by radial wall 41, and extends downward into the top of tank 12.

The valve chamber 34 is adapted to be moved into positions establishing communication between pairs of adjacent chambers in the bottom member 14, for example, between chambers 31 and 35, as shown in FIGURE 4, to establish communication between the conduits connected thereto, namely conduit 32 and waste outlet conduit 18, in the illustrated position of valve element 25, wherein liquid from the bottom of tank 12 may be drained therefrom through the waste conduit 18.

Figure 3:
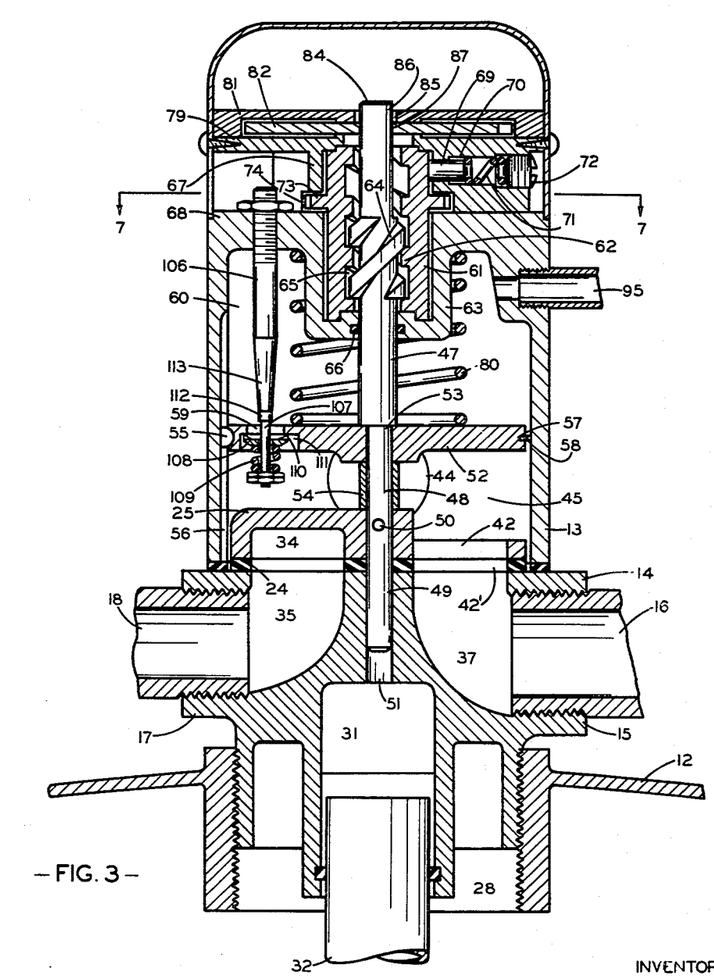
FIGURE 3 is an enlarged vertical cross sectional view taken on the line 3—3 of FIGURE 1.

The valve element 25 is further formed with a port 42 which is movable so as to place the space above the valve element 25 at times in communication with respective chambers in the member 14, for example, to place the space above the valve element 25 in communication with the chamber 37 through an aperture 42' in gasket 24, as shown in FIGURE 3, leading to the treated soft water outlet conduit 16. A raw water inlet conduit 44 is connected to the lower portion of the cylindrical housing member 13 of the main body of the valve, whereby the water supply conduit 44 is in communication with the space above the valve element 25, designated at 45 in FIGURE 3.

As will be readily apparent, it is necessary at specified points in the cycle of operation of the apparatus to connect the raw water supply conduit 44 to the chambers leading to the different conduits, for example, to supply raw water to the brine tank, in which case the passage 21 must be placed in communication with the water supply conduit 44, or to at times allow flow of untreated water to the conduit 16 and to ejector tube 29, in which case port 42 is placed so as to connect space 45 in communication with chamber 37 and aperture 30, as shown in FIGURE 4.

It will be noted that flow of untreated water through the ejector tube 29 and injector tube 27 creates a vacuum in cavity 26 which draws brine from conduit 20 into cavity 26 and thence through tube 27 into passage 28 and into the top of tank 12.

The following is a description of a typical cycle of operation of the valve:

(1) In the "service" position of valve element 25, the chamber 34 connects chamber 31 to chamber 37, and the port 42 in the valve element is positioned so as to expose chamber 39 and port 22 to the raw water space 45. Raw water entering through conduit 44 passes through chamber 39 into the top of the tank 12, some raw water flowing through the port 22 and the conduit 19 to the brine tank. The brine tank is provided with a suitable float valve which cuts off the flow through conduit 19 when the water level in the brine tank reaches a predetermined height. The raw water flowing through chamber 39 enters the top of tank 12, flowing downwardly through the chemical in the tank, and then flowing upwardly through the conduit 32 into the chamber 31, whence it flows through valve element chamber 34 into the chamber 37 and through the outlet conduit 16 to the main soft water distributing system. The raw water is softened during its downward passage through the chemical in tank 12.

(2) Upon exhaustion of the chemical in tank 12, the valve element 25 is first unseated from gasket 24 and then rotated to the "wash" position. In the "wash" position, the chamber 34 connects chamber 39 with chamber 35, and port 42 exposes chamber 31 to the raw water space 45. Raw water from conduit 44 passes through port 42 into chamber 31 and thence through conduit 32 to the bottom of the tank 12. It then passes upwardly through the chemical material in the tank into chamber 39, and thence through chamber 34 to chamber 35, passing into the waste conduit 18. The waste conduit 18 is suitably restricted to limit the flow to a desirable rate.

(3) After the "wash" period, the valve element 25 is unseated and rotated to the "brine" position. In this position, shown in FIGURE 4, chamber 34 connects chamber 31 with chamber 35, and port 42 exposes chamber 37 to the raw water space 45. Raw water from conduit 44 passes through port 42 into the chamber 37 and thence passes through conduit 16 to the soft water distributing system. In this position of valve element 25, port 42 also exposes the raw water space 45 to the gasket aperture 30 and the ejector tube 29. Raw water thus flows through the ejector tube 29 exerting suction in conduit 20, as previously described, which draws brine from the brine tank through the conduit 20 and into cavity 26, where it mixes with the raw water passing through ejector 29 and flows thence through the tube 27 into the top of tank 14. This brine solution then passes downwardly through the chemical material in the tank, regenerating the chemical material, and then passes upwardly through conduit 32 to chamber 31, flowing through the chamber 34 and then to the waste conduit 18 through chamber 35. The conduit 20 is provided with a check valve 46 (FIGURE 2) preventing flow from the ejector cavity 26 to the brine tank, and also preventing flow from the brine tank when the brine level has been reduced to a preset value.

(4) When sufficient brine has been passed through the chemical material in tank 12, the valve element 25 is unseated and turned to "rinse" position. In this position chamber 34 again connects chambers 31 and 35, and the port 42 exposes chambers 39 and 37 to the raw water supply space 45. Raw water from conduit 44 passes through chamber 37 to conduit 16, and thence to the soft water distributing system, and also, raw water from space 45 passes through the chamber 39 to the top of tank 12, flowing downwardly through the chemical material in the tank and then upwardly through the conduit 32, chamber 31, chamber 34, and chamber 35 to the waste conduit 18. When sufficient rinse water has been passed through the chemical material in the tank 12, the valve element 25 is moved to the "service" position, for a repetition of the above described cycle.

As will be presently pointed out, the valve assembly provides a means of successively establishing the required connections between the various fluid passages associated with the apparatus.

Designated at 47 in FIGURE 3 is a stem which is secured axially to the valve element 25, said stem having a reduced portion 48 which extends through a bore 49 formed centrally in the valve element 25 and which is rigidly secured thereto by transverse fastening pin 50. The lower portion of reduced portion 48 extends slidably into a guide bore 51 formed centrally in the member 14 and opening into chamber 31 to which is connected the conduit 32, said conduit extending to the bottom of the tank 12, as previously mentioned.

Motive force for successively establishing the required connections between the various fluid passages associated with the apparatus is derived from a pressure sensitive element. Thus, designated at 52 is a generally circular plate member which is secured on the reduced stem portion 48 adjacent the annular shoulder 53 defined between the reduced portion and the main portion of the stem 47, a spacer sleeve 54 being provided on the reduced stem portion between plate 52 and valve element 25. The plate 52 is rotatable on the reduced portion 48 but is held against rotation relative to the cylindrical housing member 13 by a key element 55 provided on the peripheral portion of the plate 52 which slidably engages in an axially extending groove 56 formed in the inner surface of housing member 13. Thus, the stem 47 and the valve element 25 carried thereby may rotate freely relative to the plate member 52, but the stem and valve are constrained to move in an axial direction with said plate member.

The plate member 52 is formed with a peripheral groove 57 in which is mounted a ring segment 58 of resilient material which slidably engages the inside surface of the housing member 13. An orifice 59 in plate 52 communicates with the space on both sides of plate 52.

As will be seen, the plate member 52, thus defines a first space 45, located below plate 52, and a second space 60 located above the plate member 52, said spaces being in communication through orifice 59, the assembly comprising a form of pressure sensitive element responsive axially to a pressure difference between the first space 45 and the second space 60.

A novel feature of my invention is the means provided to cause rotary movements of valve element 25. Thus, nut member 61, which is formed with an internal thread 62, is rotatably mounted in the hollow boss 63. The upper portion of stem 47 extends through the nut member 61 and is formed with a helical thread 64 which is engageable with the helical thread 62. The threads 62 and 64 being formed with clearance 65 providing suitable axial movement of stem 47 before said threads engage. As shown in FIGURE 3, a suitable sealing ring 66 is provided in the bottom wall of the boss 63 around the central aperture thereof to substantially seal the stem 47 relative to the interior of boss 63, but allows the stem to slide axially.

The top portion of the nut member 61 is rotatably received in a guide block 67 secured on the top wall 68 of housing member 13.

The upper portion of nut member 61 is frictionally engaged by a shoe member 69 which is mounted slidably in a bore 70 formed in the guide block 67 and which extends radially relative to the nut member 61. A coil spring 71 bears against the outer end of the shoe member 69, a plug 72 being threadedly engaged in the outer end portion of the bore 70 to provide an adjustable bearing for spring 71.

Figures 7, 8:
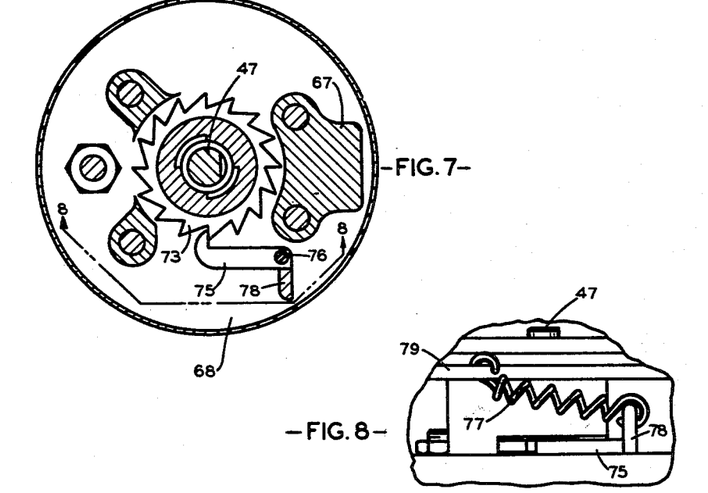
FIGURE 7 is a horizontal cross sectional view, taken on the line 7—7 of FIGURE 3.
FIGURE 8 is a fragmentary elevational view of an upper portion of the multi-port valve assembly taken on the line 8—8 of FIGURE 7.
Figure 9:
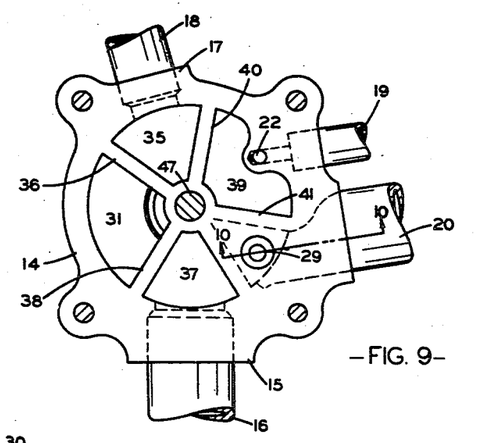
FIGURE 9 is a horizontal cross sectional view taken on the line 9—9 of FIGURE 5.

The nut member 61 is formed with an integral ratchet disc 73 located below the shoe member 69, as shown in FIGURE 3, the ratchet disc being rotatable in a circular cavity 74 provided therefore in the guide block 67. A pawl member 75 is pivoted at 76 to the top wall 68 of housing member 13 and is biased into contact with the ratchet disc 73 by a coil spring 77 connected between an arm 78 provided on pawl member 75 and a flange 79 formed thereabove on the block 67, as shown in FIGURE 8, whereby to bias the pawl member 75 into engagement with the ratchet disc 73 and to prevent clockwise movement of said ratchet disc, as viewed in FIGURE 7, but to allow the disc 73 to rotate counterclockwise.

As will be readily apparent, when the plate 52 moves axially toward space 60, the helical thread 64 of stem 47 engages against the helical thread 62 of the nut member 61. Since the nut member 61 is held against clockwise movement by the pawl member 75, the stem 47 is forced to rotate counterclockwise, thereby rotating the valve element 25 similarly.

This novel means of causing rotary movements to the valve element 25 permits full rotation of said element from one operating position to the next during axial movement of plate 52 toward space 60. Since the threads 62 and 64 are loosely interengaged, lost rotary motion is provided which allows the valve element 25 to be first unseated a short distance from gasket 24 before any rotary motion thereof takes place, thereby preventing damage to gasket 24. Wear on the threads 62 and 64 will not affect the rotary motion transmitted by the mechanism, but will merely provide increased clearance for lost motion or unseating of the valve element 25 prior to rotation thereof.

Control means for at times producing a pressure difference across the pressure sensitive element, sustaining this pressure difference through turning movements of the valve element 25 from one operating position to the next, locking the valve element 25 in the new operating position, and returning the valve element 25 to seated position on gasket 24 is provided. Thus, disposed around the hollow depending boss 63 is a coiled spring 80 bearing at its top end against the top wall 68 of housing member 13, and bearing at its bottom end on the plate 52, biasing the plate 52 toward the space 45, and thereby valve element 25 and stem 47 to seated position of valve element 25 on gasket 24.

Figure 1:
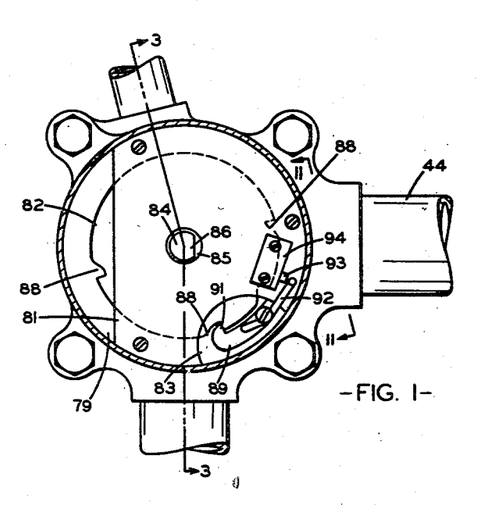
FIGURE 1 is a horizontal sectional view taken through the top portion of an improved multi-port valve assembly constructed in accordance with the present invention, said view being taken substantially on the line 1—1 of FIGURE 2.

Secured on the top flange 79 of block 67 is a downwardly concaved cover plate 81 containing a notched register disc 82, the cover plate 81 being cut away at a chordal edge 83 thereof, as shown in FIGURE 1, whereby to expose a peripheral portion of the register disc 82. The top end of stem 47, shown at 84, extends through a circular opening 85 provided centrally in the cover plate 81. The register disc 82 is keyed to the top portion 84 of the stem 47 so that it rotates therewith but allows the stem to slide freely in an axial direction, as viewed in FIGURE 3. Thus, the top portion 84 of the stem is formed with a flat 86, and the central aperture 87 in disc 82 is correspondingly shaped so that it cannot rotate relative to the portion 84 of the stem 47. The register disc 82 thus follows the rotation of the stem 47.

The disc 82 is formed with notches 88 in its periphery corresponding to the various rotated positions of the valve element 25. A pawl member 89 is pivoted on the top flange 79 of block 67 and is biased into engagement with the periphery of the notched register disc 82 by spring 90, said pawl being formed with a hooked end 91, and extension 92 which is engageable with the operating plunger 93 of a micro-switch 94, whereby to close the micro-switch 94 when the hooked end 91 of pawl member 89 is not received in one of the notches 88. However, when the hooked end 91 comes into registry with one of the notches 88 so as to be received therein, the extension 92 disengages the micro-switch plunger 93 allowing the micro-switch to open.

Designated at 95, in FIGURE 2, is a conduit which is connected to the upper portion of housing member 13 and which is thus in communication with the upper space 60 in said housing member. Conduit 95 is provided with a solenoid valve 96, the valve being normally closed and opening responsive to the energization of its winding 97. The conduit 95 opens to atmosphere beyond the valve 96, so that when the winding 97 is energized, the upper space 60 in the housing member 13 is exposed to atmosphere allowing the pressure in the space 60 to adjust toward atmospheric pressure.

As shown in FIGURE 6, the solenoid winding 97 has a pair of terminal wires 98 and 99 which are connected momentarily to a pair of line wires 100 and 101 at specified times determined by the operation of the conventional timed switch device 102. Additional wires 103 and 104 lead to a current supply source, the wire 103 being connected to the solenoid winding terminal wire 98, and the wire 104 being connected through the micro-switch 94 and a wire 105 to the solenoid winding terminal wire 99. Thus, the solenoid winding 97 is maintained energized from the wires 103 and 104 when the hooked end 91 of pawl member 89 is not received in one of the notches 88.

In operation of the control means it will be noted that the space 45 is in constant communication with the raw water supply conduit, and is therefore at water supply pressure. Since this pressure is substantially above atmospheric pressure, whenever conduit 95 is exposed to atmosphere the pressures on the opposite sides of the plate 52 become unbalanced, causing the plate 52 to move toward the space 60 whereby the valve element 25 is retracted from its normal seated position on gasket 24, spring 80 is compressed, and threads 62 and 64 engage. This occurs when timer 102 energizes solenoid winding 97 at a number of specified times, whereby the solenoid valve 96 opens, exposing conduit 95 to atmosphere. The movement of plate 52 toward space 60 rotates the valve element 25 counterclockwise, as viewed in FIGURE 6, to its next position, the rotation of the stem 47 causing the register disc 82 to similarly rotate. The pawl 89 is thus rotated counter-clockwise, as viewed in FIGURE 6, closing the micro-switch 94 and sustaining the solenoid winding 97 energized, holding conduit 95 open until the hooked end 91 of the pawl member 89 is received in the next notch 88, representing the next operative position of the valve element 25. Thus, when the hooked end 91 of pawl member 89 is received in the next notch 88, solenoid winding 97 becomes de-energized by the opening of the micro-switch 94, as well as by the previous opening of the timer 102 contact, conduit 95 is closed and the pressures in the spaces 45 and 60 equalize through orifice 59, allowing spring 80 to force the plate member 52 and valve element 25 back toward space 45. Thus the helical thread 64 comes into contact with the helical thread 62, the force of spring 80 acting to move the thread 64 downwardly, as is viewed in FIGURE 3, relative to the thread 62. The axial force exerted by thread 64 on thread 62 causes stem 47 to rotate clockwise until notch 88 seats firmly against the hooked end 91 of pawl member 89, thereafter forcing the nut member 61 to rotate counter-clockwise, as viewed in FIGURE 7, allowing valve element 25 to be returned to a seated position on gasket 24 without causing any further rotation of the valve element 25.

Regulating means to control the pressure difference across plate 52 is desirable in view of the magnitude of the forces present during the initial retraction of the valve element 25 from seated position on gasket 24, especially in large valve assemblies. Thus, in large valves the force holding the valve element 25 to its seat may be as high as twenty thousand pounds when the raw water supply is at one hundred pounds per square inch. The force developed by the plate 52 therefore would necessarily be twenty thousand pounds plus the additional force to compress the spring 80 and overcome friction. Once the valve element 25 has been retracted from its seat slightly, the force required to further move and rotate same will be comparatively small.

Thus, a round orifice 59 is provided in the plate 52 which cooperates with a stationary stem member 106 secured to and extending from the top wall 68 of the housing member 13. Stem member 106 is provided with a depending reduced portion 107 on which is slidably engaged the square plate 108 biased upwardly by a coil spring 109 mounted on the reduced stem portion 107 below the square plate 108. Square plate 108 is provided with depending corners 110 which are turned upwardly to contact the surface of a recess 111 provided in the bottom of the plate 52 biased thereon by the spring 109. A stop collar 112 on the member 106 limits movements of the square plate 108 when the plate 52 moves toward space 60. Above the collar 112, the member 106 is tapered, as shown at 113, the taper being suitably formed whereby to define with the orifice a constantly decreasing annular passage, decreasing in accordance with the selected contour of the taper 113, said annular passage decreasing as the plate 52 moves toward the space 60 beyond the collar 112. Thus, when the plate 52 is moved into space 60 to full extended position, a smaller annular restriction is provided between the wall of orifice 59 and tapered portion 113 of the stationary stem member 106 which allows a smaller controlled amount of leakage from space 45 to space 60, and which thus permits the pressure in space 60 to fall at a controlled rate prior to the closure of the solenoid valve 96. Upon closure of the solenoid valve 96 plate 52 is returned toward space 45 by spring 80. There is enough leakage between the square plate 108 and the surface of recess 111 engaged thereby by the corners 110 to allow spring 80 to return valve element 25 and bring the valve element 25 into seating engagement with the gasket 24.

In operation, the regulator controls the pressure across the plate 52 in accordance with the movement of the plate. With the valve element 25 seated on gasket 24 and the plate 52 correspondingly located toward the space 45, square plate 108 substantially closes off orifice 59, whereby a large pressure difference is developed across plate 52 with opening of solenoid valve 96. This large pressure difference develops sufficient thrust on plate 52 to cause it to move the valve element a short distance from its seat. Immediately after the valve element has left its seat, but before the helical threads 62 and 64 have engaged, the square plate 108 contacts the stop collar 112 on the member 106 whereby further movement of plate 52 toward space 60 provides a larger passage through orifice 59 allowing a larger flow from space 45 to space 60, reducing the pressure difference across plate 52, and therefore the force developed by the plate 52 to a value just sufficient to rotate the valve element 25 at a slow and even speed. The taper 113 of the member 106 then diminishes the annular passage between the orifice 59 and the member 106 with further movement of the plate 52 toward space 60, increasing the force developed by the plate 52 to overcome the increasing resistance of the spring 80. Thus, large pressure variations of the operating water will not unduly change the operating characteristics of the mechanism, and smooth, even operation will result without the need of external controls or readjustment thereof.

Figure 12:
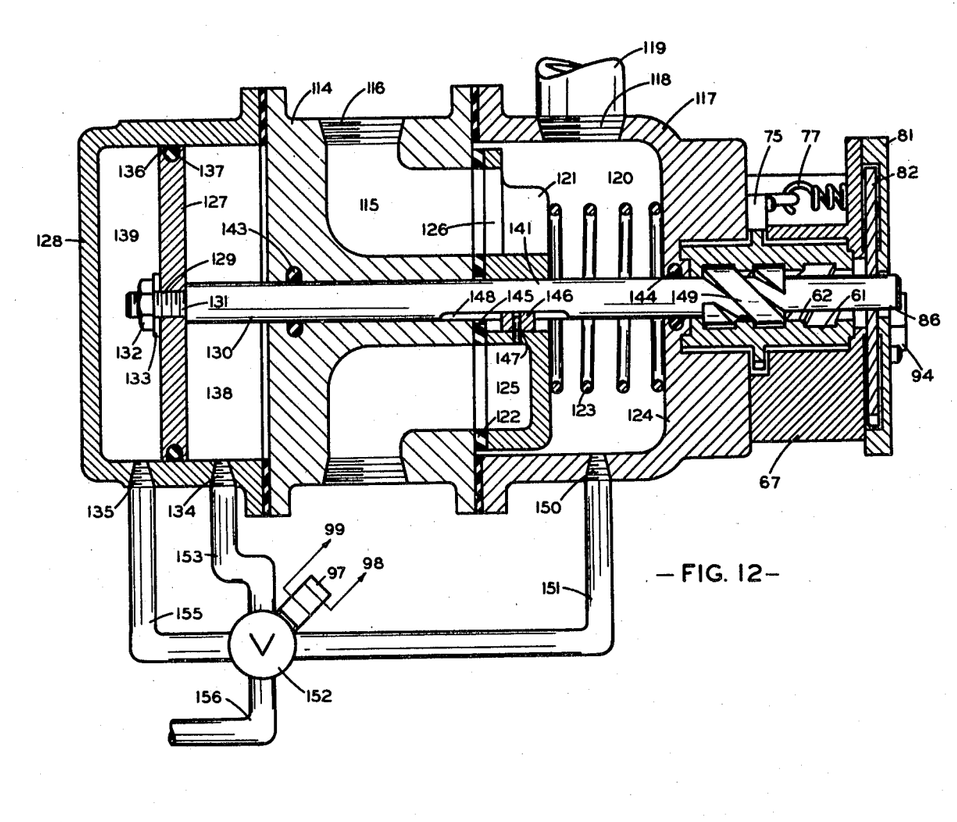
FIGURE 12 is a cross sectional view of an alternate arrangement of an improved multi-port valve assembly.

While a specific embodiment of an improved multi-port valve device has been disclosed in the foregoing description, it will be understood that various modifications within the spirit of the invention may occur to those skilled in the art. For instance, as shown in FIGURE 12, a modification may be desired wherein the valve element is constrained to remain seated on the body member during turning movements of the valve element. Thus, as illustrated, body member 114 is formed with a plurality of chambers 115, and conduit connections 116, whereby the body member 114 may be connected as required to perform the respective successive operations of the equipment. Sealingly connected to the body member 114 is a housing member 117 which includes a conduit connection 118 whereby the water supply conduit 119 is in communication with space 120 above the valve element 121. Sealing gasket 122 is secured to body member 114 and provides a relatively hard seat for valve element 121 whereby valve element 121 may be rotated relative to body member 114 and gasket 122 while the valve element 121 is substantially seated on gasket 122. Spring 123 bearing against valve element 121 and the wall 124 of housing member 117 biases valve element 121 to seated position on gasket 122 and body member 114.

Valve element 121 is formed with valve chamber 125 of substantial angular width which establishes communication between various chambers of body member 114. Valve element 121 is further formed with port 126 which places the water supply conduit 119 in communication with chambers in body member 114.

As so far described, the apparatus conforms with a characteristic multi-port valve commonly encountered in water treatment applications wherein the valve element 121 is rotated relative to the body member 114 to successively establish the required connections between the various fluid passages associated with the apparatus.

Motive force for causing rotary movements of valve element 121 is derived from a pressure sensitive element comprising a generally circular plate 127 contained within housing member 128 and secured to the reduced portion 129 of stem 130 by the annular shoulder 131, defined between the reduced portion 129 and the main portion 130 of the stem, and constraining nut 132 and washer 133. Housing member 128 is sealingly connected to body member 114 and is formed with a conduit connection 134, located on the side of housing member 128 between plate 127 and body member 114, and conduit connection 135 located adjacent plate 127 and on the side thereof opposite conduit connection 134. The plate member 127 is formed with a peripheral groove 136 in which is mounted a suitable sealing ring 137 whereby to sealingly engage the inside surface of the housing member 128. As will be seen, the plate member 127 thus defines a first space 138, located adjacent body member 114 and a second space 139 located adjacent plate 127 and on the side thereof opposite the first space 138.

Stem 130 extends through a bore 140 formed centrally in body member 114, and a bore 141 formed centrally in valve element 121, and further extends through bore 142 in housing member 117, a suitable sealing ring 143 being provided in body member 114 around stem 130 to substantially seal the interior of body member 114 and housing member 117 from the interior of housing member 128. A further sealing ring 144 is provided in housing member 117 around stem 130 to substantially seal the interior of housing member 117 relative to the outside of housing member 117. Gasket 122 is formed with a central aperture 145 whereby to allow stem 130 to move freely relative to gasket 122.

Valve element 121 is provided with a key element 146 located axially in bore 141 and is securely fastened to valve element 121 by pin 147. Key 146 slidably engages a keyway 148 of suitable length in stem 130 to allow stem 130 to slide axially relative to valve element 121, but constraining valve element 121 to rotate with the stem 130. The end of stem 130 extending through the wall 124 of housing member 117 is formed with the helical thread 149 which engages the helical thread 62 of nut member 61.

The valve assembly is provided with nut member 61, guide block 67, ratchet disc 73, pawl member 75, coil spring 77, cover plate 81, notched register disc 82, pawl member 89, spring 90, and micro-switch 94, as previously described. Stem 130 is further formed, as previously described, with a flat 86 corresponding to the central aperture 87 in disc 82, whereby disc 82 cannot rotate relative to stem 130 and thus follows the rotation of the stem 130.

Housing member 117 is provided with a conduit connection 150 and conduit 151 which is connected to a solenoid valve 152, conduit 151 thus being in communication with space 120 and thereby the water supply conduit 119. Solenoid valve 152 is provided with conduit 153 which is connected to conduit connection 134 in housing member 128, and conduit 155 which is connected to conduit connection 135 in housing member 128. Another conduit 156 is provided on solenoid valve 152 and is open to atmosphere.

Solenoid valve 152 has a winding 97 as previously described, and is connected through terminal wires 98 and 99, line wires 100 and 101, timed switch device 102, additional wires 103, 104, 105 to a current supply and micro-switch 94 as shown in FIGURE 6. Solenoid valve 152 is spring loaded whereby, with winding 97 de-energized, solenoid conduit 151 is in communication with solenoid conduit 153, thereby exposing space 138 to the water supply conduit 119. Further, with solenoid winding 97 de-energized, solenoid conduit 155 is in communication with solenoid conduit 156 thereby exposing space 139 to atmosphere. However, when solenoid winding 97 is energized, as previously described, solenoid conduit 156 is placed in communication with solenoid conduit 153 thereby exposing space 138 to atmosphere, and solenoid conduit 152 is placed in communication with solenoid conduit 155 thereby exposing space 139 to water supply conduit 119. Since water supply conduit 119 is at a pressure substantially above atmospheric pressure, plate 127 will move toward space 138, threads 149 and 62 will cause stem 130 to rotate thereby causing valve element 121 to rotate to its next operative position, as previously described. When solenoid winding 97 is de-energized, as previously described, solenoid valve will return to its normal position biased thereto by its spring, causing solenoid conduit 156 to communicate with solenoid conduit 155 thereby exposing space 139 to atmosphere, and solenoid conduit 152 will communicate with solenoid conduit 153 thereby exposing space 138 to water supply conduit 119. Plate 127 and stem 130 will therefore return to starting position without causing further rotation of valve element 121 as previously described.

It is intended that no limitations be placed on the invention by the specific embodiments disclosed in the foregoing descriptions except as defined by the scope of the appended claims.

What I claim is:

1. In a valve of the character described, a multi-chamber body member, a pivoted valve element rotatable to different operative positions relative to said body member, a pressure sensitive element axially movable and responsive to a pressure difference thereon, means to rotate said valve element, said means responsive to axial movement of said pressure sensitive element, means formed and arranged to at times produce a pressure difference on said pressure sensitive element, means for regulating said pressure difference on said pressure sensitive element during axial movement thereof, last said means responsive to movement of said valve element.

2. In combination, a flow control valve comprising a body having a face provided with flow passages, a valve element cooperable with said face and mounted to be turned to different rotative positions to control the flows through the body, means for rotating said valve element, said means including a valve stem connected to said valve element, axially movable pressure sensitive means, said last mentioned means including a means coacting with said means for rotating said valve element to rotate said stem and said element, in response to fluid pressure acting on said pressure sensitive means, an auxiliary valve controlling the application of fluid pressure on said pressure sensitive means operative in one position thereof to effect axial movement of said pressure sensitive means from an initial position and operative in the other position thereof to effect axial return movement of said pressure sensitive means to said initial position, means for operating said auxiliary valve to said one position to rotate said stem and said valve element, and means responsive to rotation of said stem to selected operating positions for operating said auxiliary valve to said other position and thereby effect return movement of said pressure sensitive means to said initial position.

3. In a valve of the character described, a multi-chamber body member, a pivoted valve element rotatable to different operating positions relative to said body member, a pressure sensitive element axially movable and responsive to a pressure difference thereon, co-operating helical ridge and groove elements for turning said valve element to selective operating positions in response to movement of said pressure sensitive element, ratchet means to restrict the rotation of said valve element to one direction, means formed and arranged to produce a pressure difference on said pressure sensitive element.

4. In a valve, a multi-ported body member, a pivoted valve element rotatable to different operative positions relative to said body member, a pressure sensitive element axially movable and responsive to a pressure difference thereon, means to rotate said valve element, said means responsive to axial movement of said pressure sensitive element, flow control means formed and arranged to at times produce a pressure difference on said pressure sensitive element, means for regulating said pressure difference on said pressure sensitive element, said regulating means including a flow restricting orifice, and a means to change the effective flow area of said restricting orifice during movement of said pressure sensitive element.

5. In a valve, a multi-ported body member, a pivoted valve element rotatable to different operative positions relative to said body member, a pressure sensitive element axially movable and responsive to a pressure difference thereon, means to rotate said valve element, said means responsive to movement of said pressure sensitive element, an index plate operatively connected to said valve element to effect rotation of said index plate in unison with said valve element, an auxiliary valve for controlling the application of fluid pressure on said pressure sensitive element, said auxiliary valve operative in one position thereof to effect movement of said pressure sensitive element from an initial position and rotate said valve element, and operative in the other position thereof to effect return movement of said pressure sensitive element to said initial position, means for operating said auxiliary valve to one position and effect rotation of said valve element, and means responsive to rotation of said index plate to operate said auxiliary valve to said other position and effect return movement of said pressure sensitive element to said initial position.

6. In a valve, a multi-ported body member, a pivoted valve element rotatable to different operative positions relative to said body member, a pressure sensitive element movable and responsive to a pressure difference thereon, means to rotate said valve element from one operative position to the next operative position, said means responsive to movement of said pressure sensitive element, an auxiliary valve, a first auxiliary valve position thereof for producing a first pressure condition on said pressure sensitive element and effect movement of said pressure sensitive element from an initial position, and a second auxiliary valve position thereof for producing a second pressure condition of said pressure sensitive element and effect return movement of said pressure sensitive element to said initial position, means to operate said auxiliary valve to said first auxiliary valve position, a rotatable index plate operatively connected to said pressure sensitive element to effect rotation of said index plate in response to movement of said pressure sensitive element, and means operative by rotation of said index plate to operate said auxiliary valve to said second auxiliary valve position and effect return movement of said pressure sensitive element to said initial position.

References Cited in the file of this patent

UNITED STATES PATENTS

| | | |
|---|---|---|
| 802,954 | Waterman | Oct. 24, 1905 |
| 951,318 | Kjerulff | Mar. 3, 1910 |
| 1,374,323 | Rathburn | Apr. 12, 1921 |
| 1,960,515 | Shield | May 29, 1934 |
| 2,631,665 | Perrin | Mar. 17, 1953 |
| 2,738,807 | Addison | Mar. 20, 1956 |
| 2,870,788 | Hull et al. | Jan. 27, 1959 |
| 2,936,737 | Miller | May 17, 1960 |